United States Patent
Hwang

(10) Patent No.: US 12,426,087 B2
(45) Date of Patent: Sep. 23, 2025

(54) METHOD AND APPARATUS FOR RESOURCE ALLOCATION CONTENTION IN DISTRIBUTED COMMUNICATION SYSTEM

(71) Applicant: ELECTRONICS AND TELECOMMUNICATIONS RESEARCH INSTITUTE, Daejeon (KR)

(72) Inventor: Hyun Gu Hwang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 401 days.

(21) Appl. No.: 18/295,608

(22) Filed: Apr. 4, 2023

(65) Prior Publication Data

US 2023/0337280 A1 Oct. 19, 2023

(30) Foreign Application Priority Data

Apr. 15, 2022 (KR) .................. 10-2022-0046833
Dec. 26, 2022 (KR) .................. 10-2022-0184090

(51) Int. Cl.

| | |
|---|---|
| *H04W 72/0446* | (2023.01) |
| *H04W 74/08* | (2009.01) |
| *H04W 74/0808* | (2024.01) |
| *H04L 27/26* | (2006.01) |
| *H04W 72/02* | (2009.01) |
| *H04W 72/50* | (2023.01) |

(52) U.S. Cl.
CPC ... *H04W 74/0808* (2013.01); *H04W 72/0446* (2013.01); *H04W 74/08* (2013.01); *H04L 27/2671* (2013.01); *H04W 72/02* (2013.01); *H04W 72/50* (2023.01)

(58) Field of Classification Search
None
See application file for complete search history.

(56) References Cited

U.S. PATENT DOCUMENTS

| 8,477,593 B2 | 7/2013 | Wei et al. |
|---|---|---|
| 11,317,445 B2 | 4/2022 | Fan et al. |
| 11,356,828 B2 | 6/2022 | Ye et al. |

(Continued)

FOREIGN PATENT DOCUMENTS

KR 10-2034529 B1 10/2019

OTHER PUBLICATIONS

V. Loginov, A. Troegubov, A. Lyakhov and E. Khorov, "Enhanced Collision Resolution Methods With Mini-Slot Support for 5G NR-U," in IEEE Access, vol. 9, pp. 146137-146152, 2021, doi: 10.1109/ACCESS.2021.3122953. (Year: 2021).*

(Continued)

*Primary Examiner* — Salvador E Rivas
(74) *Attorney, Agent, or Firm* — Rabin & Berdo, P.C.

(57) ABSTRACT

An operation method of a station in a wireless distributed communication system may comprise: determining a probability distribution for selecting a first value in each subslot of a slot of a channel used for performing contention; selecting the first value based on the probability distribution in a subslot k among predetermined subslots, wherein k is 0 or a positive integer; transmitting a tone signal in the subslot k when the first value is selected in the subslot k; and winning the contention by selecting the first value in remaining subslots after the subslot k.

16 Claims, 13 Drawing Sheets

(56) References Cited

U.S. PATENT DOCUMENTS

| | | | |
|---|---|---|---|
| 2008/0198815 A1* | 8/2008 | Liu | H04W 74/0816 |
| | | | 370/336 |
| 2008/0212477 A1 | 9/2008 | Yun et al. | |
| 2014/0324974 A1 | 10/2014 | Park et al. | |
| 2015/0326492 A1 | 11/2015 | Jeong et al. | |
| 2016/0295589 A1 | 10/2016 | Nikopour et al. | |
| 2019/0387544 A1* | 12/2019 | Hwang | H04W 72/0446 |
| 2020/0413398 A1* | 12/2020 | Hwang | H04W 52/0229 |
| 2021/0099995 A1 | 4/2021 | Hwang | |
| 2021/0176788 A1 | 6/2021 | Shin et al. | |
| 2021/0329615 A1 | 10/2021 | Gulati et al. | |

OTHER PUBLICATIONS

ETSI, "TS 103 311-3 V1.1.1", Feb. 2017, pp. 1-746 (Year: 2017).*
Shujing Li et al., "SCMAC: A Slotted-Contention-Based Media Access Control Protocol for Cooperative Safety in VANETs", IEEE Internet of Things Journal, vol. 7, No. 5, pp. 3812-3821, May 12, 2020.

* cited by examiner

METHOD AND APPARATUS FOR RESOURCE ALLOCATION CONTENTION IN DISTRIBUTED COMMUNICATION SYSTEM

CROSS-REFERENCE TO RELATED APPLICATIONS

This application claims priority to Korean Patent Applications No. 10-2022-0046833, filed on Apr. 15, 2022, and No. 10-2022-0184090, filed on Dec. 26, 2022, with the Korean Intellectual Property Office (KIPO), the entire contents of which are hereby incorporated by reference.

BACKGROUND

1. Technical Field

Exemplary embodiments of the present disclosure relate to a technique for performing resource allocation contention in a distributed communication system, and more particularly, to a technique for performing resource allocation contention in a distributed communication system in which a resource is allocated by selecting a subslot signal in a contention tone channel based on a probability distribution.

2. Related Art

A synchronous wireless distributed communication network may be a type of direct communication system between stations. In such a synchronous wireless distributed communication network, a signal from one station can be directly transmitted to another station without going through a base station. Thus, the synchronous wireless distributed communication network may not include a base station. In addition, the stations of the synchronous wireless distributed communication network may not depend on control services of a base station. Accordingly, when a communication service is provided through the synchronous wireless distributed communication network, cost burden of users can be reduced. The synchronous wireless distributed communication system can be widely used in various fields such as direct communication between drones, direct communication between vehicles, direct communication between smartphones, and direct communication between a smartphone and an object.

Meanwhile, channels of the synchronous wireless distributed communication system may include a contention tone channel. In the contention tone channel, a frame may be divided into a plurality of slots, and a slot may be divided into a plurality of subslots. When a station performs contention using such the contention tone channel, the station can randomly select signals for the subslots. As a result, an extension of a communication distance of a tone signal in the front subslots may occur, thereby affecting signal other stations' selection in the subslots.

SUMMARY

Exemplary embodiments of the present disclosure are directed to providing a method and an apparatus for performing resource allocation contention in a distributed communication system in which a resource is allocated by selecting a subslot signal in a contention tone channel based on a probability distribution.

According to a first exemplary embodiment of the present disclosure, an operation method of a station in a wireless distributed communication system may comprise: determining a probability distribution for selecting a first value in each subslot of a slot of a channel used for performing contention; selecting the first value based on the probability distribution in a subslot k among predetermined subslots, wherein k is 0 or a positive integer; transmitting a tone signal in the subslot k when the first value is selected in the subslot k; and winning the contention by selecting the first value in remaining subslots after the subslot k.

The probability distribution may have a distribution in which a probability of selecting the first value increases linearly or exponentially as an index of the each subslot increases.

The probability distribution may be a distribution in which a probability of selecting the first value in a subslot having a first index is equal to or less than a probability of selecting the first value in a sub slot having a second index, and the first index is smaller than the second index.

The winning of the contention by selecting the first value in the remaining subslots after the subslot k may comprise: determining whether k is equal to a value obtained by subtracting 1 from a total number of subslots of the slot; regarding the station as having won the contention, when k is equal to the value obtained by subtracting 1 from the total number of sub slots; adding 1 to k, when k is not equal to the value obtained by subtracting 1 from the total number of subslots; selecting the first value again in the subslot k; transmitting the tone signal again in the subslot k when the first value is selected again in the subslot k; and repeating the contention from the determining of whether k is equal to the value obtained by subtracting 1 from the total number of subslots.

In the transmitting of the tone signal in the subslot k, the tone signal may be transmitted during a part of a total time of the subslot.

The predetermined subslots may correspond to subslots having indexes after a middle index of total subslots of the slot.

According to a second exemplary embodiment of the present disclosure, an operation method of a station in a wireless distributed communication system may comprise: selecting a subslot k from among predetermined subslots; performing carrier sensing up to a subslot k−1; transmitting a tone signal in the sub slot k when a tone signal of another station is not detected as a result of performing the carrier sensing; and winning contention by selecting a first value in remaining subslots after the subslot k, wherein a range of k is positive integers from 1 to N, and N is a number of the predetermined subslots and is a positive integer.

The operation method may further comprise: determining a probability distribution for selecting the first value in each subslot among the predetermined subslots, wherein in the winning of the contention by selecting the first value in the remaining subslots after the subslot k, the station may select the first value based on the probability distribution.

The probability distribution may have a distribution in which a probability of selecting the first value increases linearly or exponentially as an index of the each subslot increases.

The probability distribution may be a distribution in which a probability of selecting the first value in a subslot having a first index is equal to or less than a probability of selecting the first value in a sub slot having a second index, and the first index is smaller than the second index.

The winning of the contention by selecting the first value in the remaining subslots after the subslot k may comprise: determining whether k is equal to a value obtained by subtracting 1 from a total number of subslots of the slot;

regarding the station as having won the contention, when k is equal to the value obtained by subtracting 1 from the total number of subslots; adding 1 to k, when k is not equal to the value obtained by subtracting 1 from the total number of subslots; selecting the first value again in the subslot k; transmitting the tone signal again in the subslot k when the first value is selected again in the subslot k; and repeating the contention from the determining of whether k is equal to the value obtained by subtracting 1 from the total number of subslots.

The operation method may further comprising: performing carrier sensing in the subslot k when the first value is not selected in the subslot k; and regarding the station as having lost the contention, when a tone signal of another station is detected in the carrier sensing.

The predetermined subslots may correspond to subslots having indexes after a middle index of total subslots of the slot.

According to a third exemplary embodiment of the present disclosure, a station may comprise a processor, wherein the processor may cause the station to perform: determining a probability distribution for selecting a first value in each subslot of a slot of a channel used for performing contention; selecting the first value based on the probability distribution in a subslot k from among predetermined subslots, wherein k is 0 or a positive integer; transmitting a tone signal in the subslot k when the first value is selected in the subslot k; and winning the contention by selecting the first value in remaining subslots after the subslot k.

The probability distribution may have a distribution in which a probability of selecting the first value in a subslot having a first index is equal to or less than a probability of selecting the first value in a subslot having a second index, and the first index is smaller than the second index.

In the winning of the contention by selecting the first value in the remaining subslots after the sub slot k, the processor may further cause the station to perform: determining whether k is equal to a value obtained by subtracting 1 from a total number of subslots of the slot; regarding the station as having won the contention, when k is equal to the value obtained by subtracting 1 from the total number of subslots; adding 1 to k, when k is not equal to the value obtained by subtracting 1 from the total number of subslots; selecting the first value again in the subslot k; transmitting the tone signal again in the subslot k when the first value is selected again in the subslot k; and repeating the contention from the determining of whether k is equal to the value obtained by subtracting 1 from the total number of subslots.

According to the present disclosure, a station may predetermine a probability distribution for a probability of selecting 1 as a signal for each subslot of a slot of a contention tone channel. In this case, the station may predetermine a probability distribution having a distribution increasing linearly or increasing exponentially as the probability distribution for the probability of selecting 1 as a signal for each subslot of the slot of the contention tone channel. In particular, the station may determine that a probability of selecting 1 in front subslots of the contention tone channel is less than or equal to a probability of selecting 1 in rear sub slots thereof.

In addition, according to the present disclosure, when performing contention in a tone slot, the station may select 1 or 0 in each subslot to perform contention. In this case, the station may make the probability of selecting 1 or 0 in each subslot follow the predetermined probability distribution when selecting a subslot signal for each subslot. Accordingly, extension of a communication distance of tone signals in the front subslots may not occur, thereby not affecting other stations' selection of 1 or 0 as a subslot signal in each subslot.

According to the present disclosure, the station can achieve the excellent resource allocation performance. In addition, according to the present disclosure, the extension of the communication distance of tone signals may not occur in the front subslots, thereby maintaining the stability of the entire wireless distributed communication system.

DETAILED DESCRIPTION OF THE EMBODIMENTS

Figure 1:
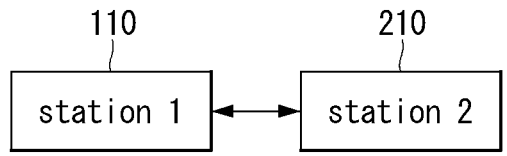
FIG. 1 is a conceptual diagram illustrating a first exemplary embodiment of a communication network.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

A communication system to which exemplary embodiments according to the present disclosure are applied will be described. The communication system to which exemplary embodiments according to the present disclosure are applied is not limited to the content described below, and the exemplary embodiments according to the present disclosure may be applied to various communication systems. Here, the communication system may be used in the same sense as a communication network.

Throughout the present disclosure, a station may refer to a terminal, a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

The station may mean various apparatuses that a mobile communication service user can use, such as a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability.

Throughout the present disclosure, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

The following techniques may be used for communication systems using various access schemes such as code division multiple access (CDMA), frequency division multiple access (FDMA), time division multiple access (TDMA), orthogonal frequency division multiple access (OFDMA), and single carrier frequency division multiple access (SCFDMA).

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a conceptual diagram illustrating a first exemplary embodiment of a communication network.

Referring to FIG. 1, a communication network may include a first station 110 and a second station 210. The communication network of FIG. 1 may be a synchronous wireless distributed communication network. The synchronous wireless distributed communication network of FIG. 1 may not include a separate base station. That is, the stations of the synchronous wireless distributed communication network may not depend on control services of a base station.

When there is a packet to be transmitted to the second station 210, the first station 110 may directly transmit the packet to the second station 210 and directly receive a packet from the second station 210. That is, the first station 110 and the second station 210 may transmit and receive packets through device-to-device (D2D) communication between the stations. The communication node (e.g., station, etc.) constituting the above-described communication network may support a communication protocol based on time division multiple access (TDMA) or the like. Among the communication nodes, the station may be referred to as a terminal, mobile terminal, mobile station, node, device, or the like. The communication node may have the following structure.

Figure 2:
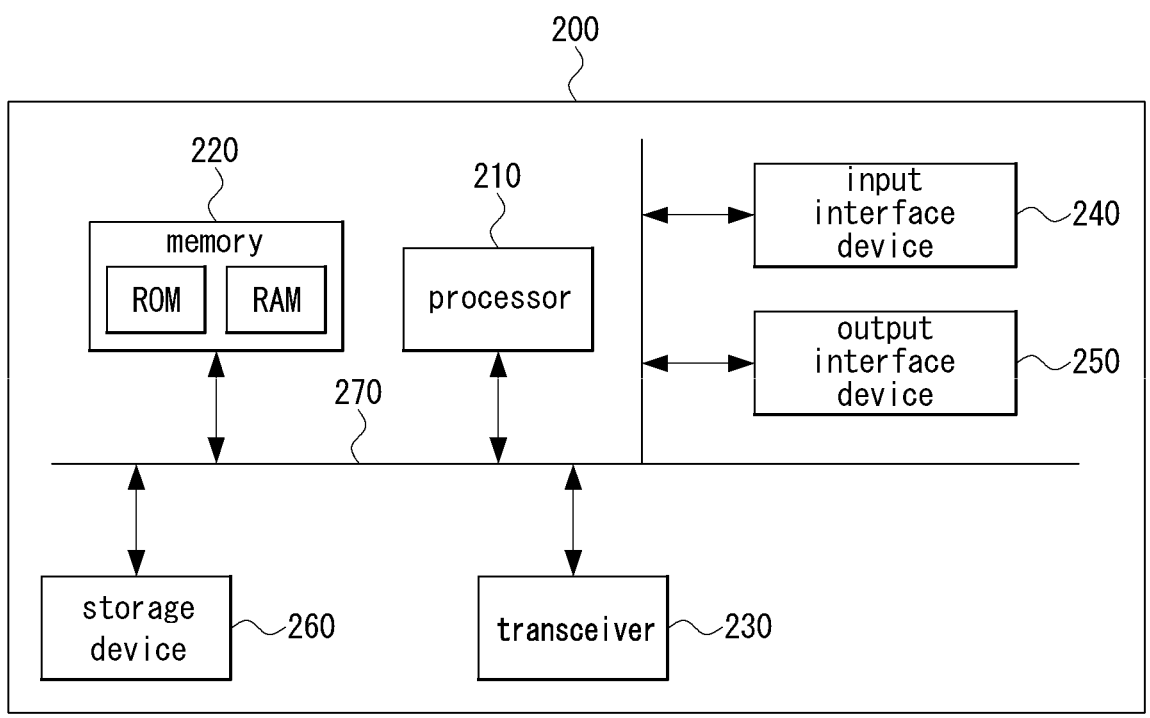
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270. However, the respective components included in the communication node 200 may be connected not to the common bus 270 but to the processor 210 through an individual interface or an individual bus. For example, the processor 210 may be connected to at least one of the memory 220, the transceiver 230, the input interface device 240, the output interface device 250, and the storage device 260 through dedicated interfaces.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Meanwhile, channels of the synchronous wireless distributed communication system may include a contention tone channel. In the contention tone channel, a frame may be divided into a plurality of slots, and one slot may be divided into a plurality of sub slots. Hereinafter, a slot of a tone channel may be referred to as a 'tone slot', and subslots constituting the tone slot may be referred to as 'tone subslots'. In addition, a slot of the contention tone channel may be referred to as a 'contention tone slot', and subslots constituting the contention tone slot may be referred to as 'contention tone subslots'. The stations may perform contention in the contention tone slot. A station that wins the contention may be allocated a communication resource mapped to the contention tone slot.

A collision detection and drop (CDAD) scheme may be one of schemes of performing contention in a tone slot. In the CDAD scheme, the contention may be performed by being divided into a first contention and a second contention. In the first contention of the CDAD scheme, each of stations may randomly select one subslot among $N_{subslot}$ subslots with equal probability. Here, $N_{subslot}$ may be a positive integer. In this case, a number indicating the subslot selected by the station may be k ($0 \le k \le N_{subslot}-1$). That is, the station may select a subslot k. Here, k may be a positive integer.

Then, the station may perform carrier sensing (CS) up to a subslot k−1. In such the carrier sensing, if a tone signal of another station (i.e., a signal transmitted by another station when the another station performs contention in the subslot) is not detected, the station may win the first contention. In this case, the winning station may continuously transmit a tone signal from the subslot k.

The stations that have won the first contention may again perform the second contention. In the second contention, each station of the stations that have won the first contention may randomly select one subslot with equal probability among subslots from a subslot k+1 to a subslot $N_{subslot}-1$. In the second contention, a number indicating the subslot selected by the station may be j ($k+1 \le j \le N_{subslot}-1$). Here, j may be a positive integer. The station may transmit a tone signal up to a subslot j−1, and may perform carrier sensing in a subslot j (i.e., sensing subslot). In the carrier sensing, a tone signal of another station may not be detected, and then the station may win the second contention. The station that has won the second contention may resume transmission of a tone signal from a subslot j+1.

As described above, since the contention is performed twice in one slot according to the CDAD scheme, it may show significantly superior performance to a slotted carrier sense multiple access/collision avoidance (CSMA/CA) scheme in which contention is performed once in one slot.

Meanwhile, a slotted-contention-based media access control protocol for cooperative safety in vehicular ad hoc networks (VANETs) scheme (hereinafter, referred to as 'SCMAC scheme') may be one of resource allocation contention schemes. Here, one slot may be divided into a reservation period (RP) and a transmission period (TP). That is, in order to transmit a packet in a TP of the slot, stations may perform contention in a RP corresponding to the TP. The RP may also consist of a plurality of subslots. The stations may perform resource allocation contention by transmitting black burst (BB) signals in these subslots.

In the SCMAC scheme, the BB signal may be transmitted as long as a subslot time. However, in the CDAD scheme, the tone signal may be transmitted only during a part of a subslot time, and the remaining time may be left as a margin. Except for the above-described difference, the BB signal and the tone signal may be almost identical to each other. In the SCMAC scheme, the station may perform contention for every subslot.

That is, each station may select 1 or 0 in the first subslot. When the station selects 1, the station may transmit a BB signal in the subslot (i.e., first subslot) and may win the contention unconditionally. When the station selects 0, the station may lose the contention if it detects a BB signal by performing carrier sensing, and may win the contention if it does not detect a BB signal by performing the carrier sensing. The stations that have won the first contention may perform the same contention again in the second subslot. The stations that have won the second contention may perform the same contention again in the third subslot. In the above-described manner, the station may perform contention a total of $N_{subslot}$ times. A station that has won a total of $N_{subslot}$ contentions during the RP may transmit a packet during the TP.

The above-described CDAD scheme may be performed in a tone slot of a contention-dedicated channel. In the SCMAC scheme, the contention may be performed in the RP, which is a contention period. The CDAD scheme may perform the contention two times in the tone slot. The SCMAC scheme may perform the contention as many times as the number of subslots in the RP.

Accordingly, a technical problem to be solved by the present disclosure is to provide a resource allocation method utilizing the contention tone channel of the synchronous wireless distributed communication system. Specifically, a technical problem to be solved by the present disclosure is to provide a method for performing efficient and stable contention in the contention tone slot of the synchronous wireless distributed communication system.

Figure 3:
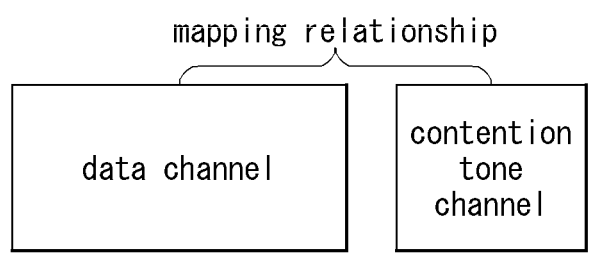
FIG. 3 is a conceptual diagram illustrating a first exemplary embodiment of a channel structure of a synchronous wireless distributed communication system.

FIG. 3 is a conceptual diagram illustrating a first exemplary embodiment of a channel structure of a synchronous wireless distributed communication system.

Referring to FIG. 3, in the synchronous wireless distributed communication system, all stations may share the same synchronization time. Channels of the synchronous wireless distributed communication system may be composed of a data channel and a contention tone channel, and they may have different center frequencies. In addition, the data channel and the contention tone channel may have a mapping relationship. Accordingly, tone slots and communication resources may be mapped respectively.

Figure 4A:
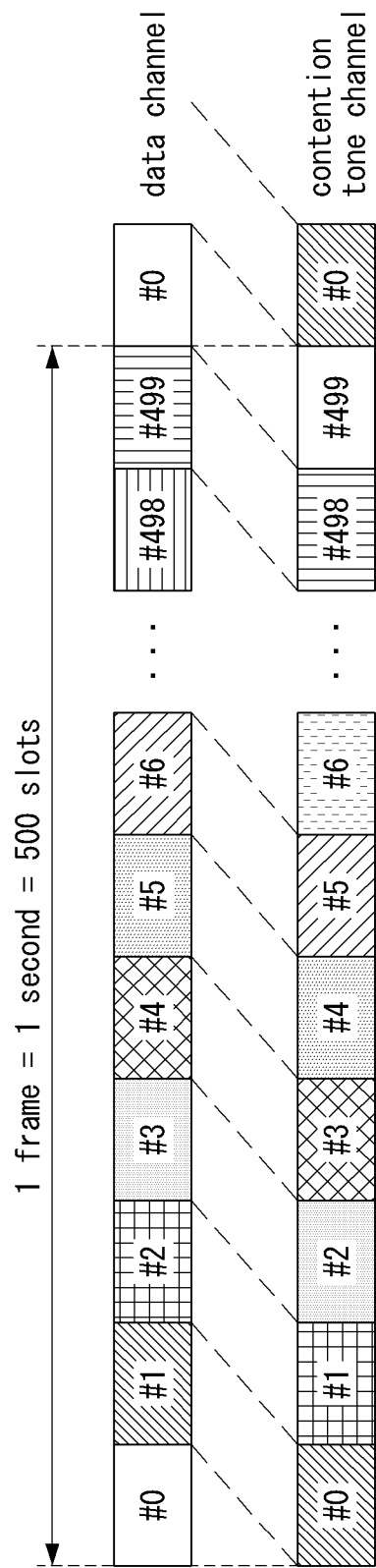
FIG. 4A is a conceptual diagram illustrating a first exemplary embodiment of a channel mapping structure of a synchronous wireless distributed communication system.

FIG. 4A is a conceptual diagram illustrating a first exemplary embodiment of a channel mapping structure of a synchronous wireless distributed communication system.

Referring to FIG. 4A, one data channel may consist of a plurality of slot resources. One tone slot may be mapped to one data slot. Here, the data slot may mean a slot constituting the data channel. For example, a tone slot #0 may be mapped to a data slot #1, a tone slot #1 may be mapped to a data slot #2, and a tone slot #3 may be mapped to a data slot #3. In this manner, the tone slots may be sequentially mapped with the data slots, respectively.

Figure 4B:
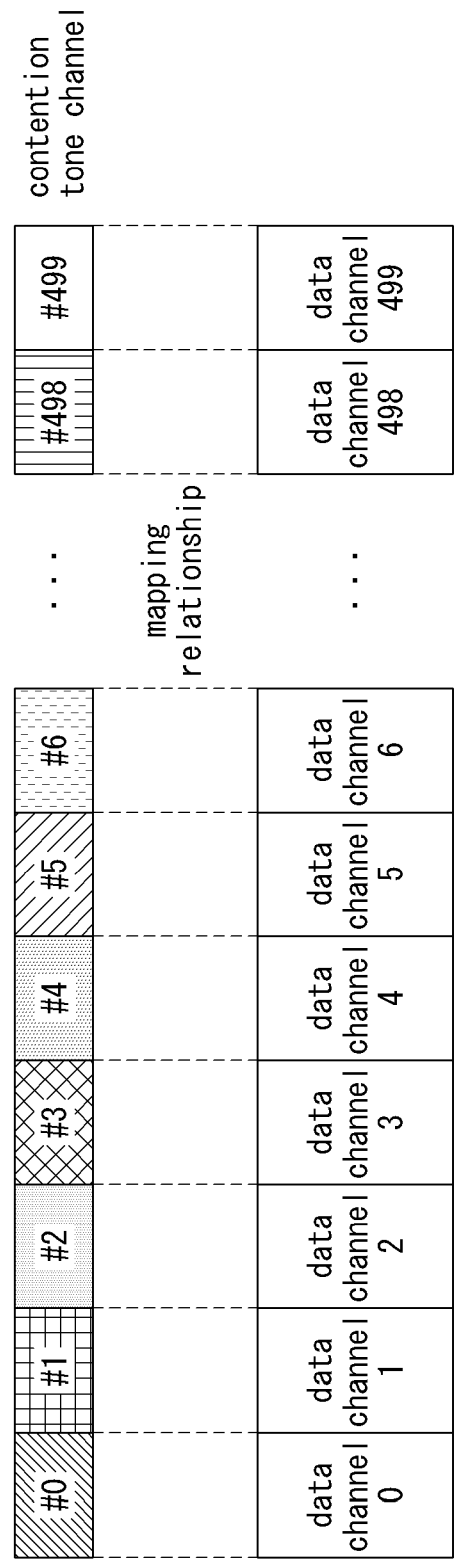
FIG. 4B is a conceptual diagram illustrating a second exemplary embodiment of a channel mapping structure of a synchronous wireless distributed communication system.

FIG. 4B is a conceptual diagram illustrating a second exemplary embodiment of a channel mapping structure of a synchronous wireless distributed communication system.

Referring to FIG. 4B, one tone slot may be mapped to one data channel. A tone slot #0 may be mapped to a data channel 1, a tone slot #1 may be mapped to a data channel 2, and a tone slot #3 may be mapped to a data channel 3. In this manner, the tone slots may be sequentially mapped with the data channels, respectively.

In the present disclosure, it may be assumed that one tone slot may be mapped to one data slot as shown in FIG. 4A. In addition, in the present disclosure, the data channel and the tone channel may each have one frame per second as shown in FIG. 4A. In addition, in the present disclosure, one frame may be composed of 500 slots from #0 to #499. These 500 slots may be referred to as tone slots. The relationship between time, frame and slots may be changeable and may not be limited to the above description.

Figure 5:
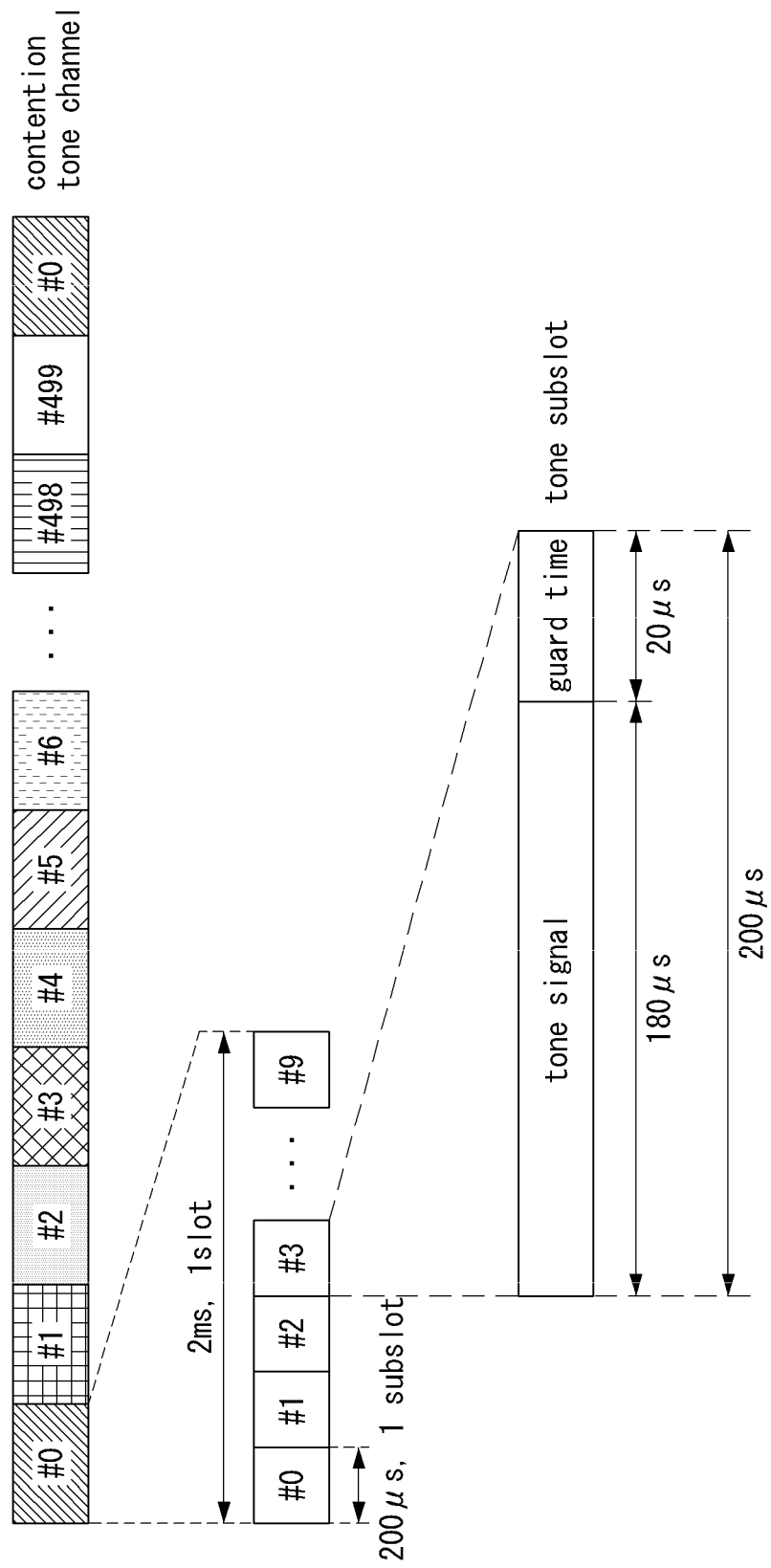
FIG. 5 is a conceptual diagram illustrating a first exemplary embodiment of a frame structure of a synchronous wireless distributed communication system.

FIG. 5 is a conceptual diagram illustrating a first exemplary embodiment of a frame structure of a synchronous wireless distributed communication system.

Referring to FIG. 5, according to a frame structure, one slot of the tone channel may consist of 10 subslots. The subslot constituting the tone slot may be referred to as a 'tone subslot'. In the CDAD scheme, a slot may be occupied by a scheme called 'slot clearing'. Such the slot clearing may usually be performed in a subslot 0. Accordingly, slot allocation contention may be performed in subslots from a subslot 1 to the last subslot, excluding the subslot 0. That is, the contention may be performed from the subslot 1.

Meanwhile, the synchronous wireless distributed communication system may set a priority by mixing the slot contention scheme and the slot clearing scheme. If a priority is set, a probability of collision between specific stations with priority may be greatly reduced. As an example, it may be assumed that a priority is assigned only to specific station(s). However, a priority setting method may be performed in various manner, and may not be limited to the exemplary embodiment.

Figure 6:
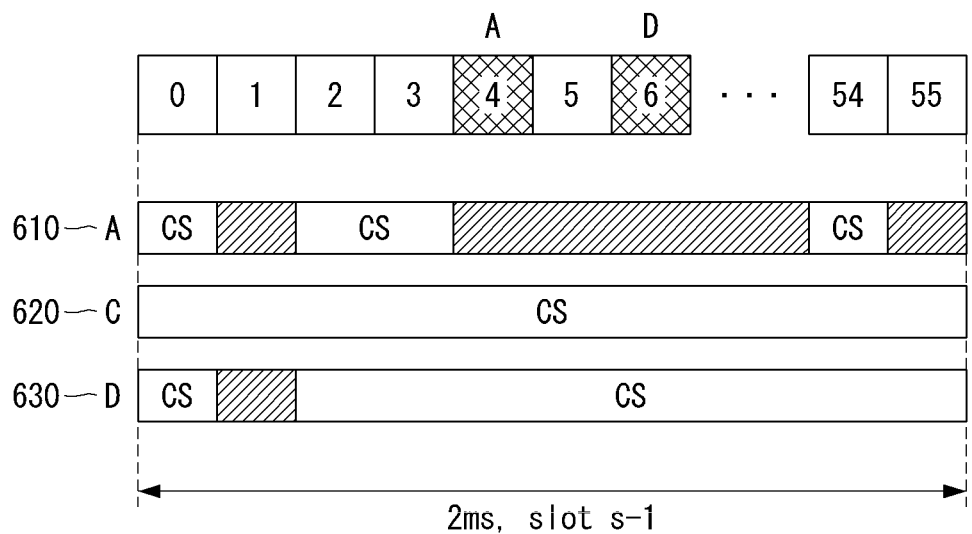
FIG. 6 is a conceptual diagram illustrating a first exemplary embodiment of a priority setting method of a synchronous wireless distributed communication system.

FIG. 6 is a conceptual diagram illustrating a first exemplary embodiment of a priority setting method of a synchronous wireless distributed communication system.

Referring to FIG. 6, the subslot 0 may be reserved as a slot-clearing subslot used by a station with priority. The subslot 1 may be reserved as a slot by which a station with priority clears stations without priority. A subslot 2 may be reserved as a clearing slot used by stations without priority. In the above-described environment, a station with priority may select the subslot 1 to block transmission of stations without priority. Thereafter, stations with priority may perform contention from the subslot 2 to the last subslot. In this case, for example, after priority contention, the second contention may be additionally performed. Of course, stations without priority may perform contention from a subslot 3 to the last subslot.

For example, referring to FIG. 6, a station A 610 and a station D 630 may have priority, and a station C 620 may have no priority. However, this is only one example, and the present disclosure is not limited to the above-described exemplary embodiment. The station A and the station D may perform clearing for stations without priority by transmitting signals in the subslot 1. As a result of this clearing, the station C, which has no priority, may unconditionally lose the contention. Then, the station A and the station D may again perform contention from the subslot 2 to a subslot 55. In this case, when the station A selects a subslot 4 and the station D selects a subslot 6, the station A 610 may win the contention. That is, the station A may have priority in the contention. The station A, which has primarily won the contention, may perform contention again secondarily. In FIG. 6, the station A may perform second CDAD contention by selecting a subslot 54.

Figure 7:
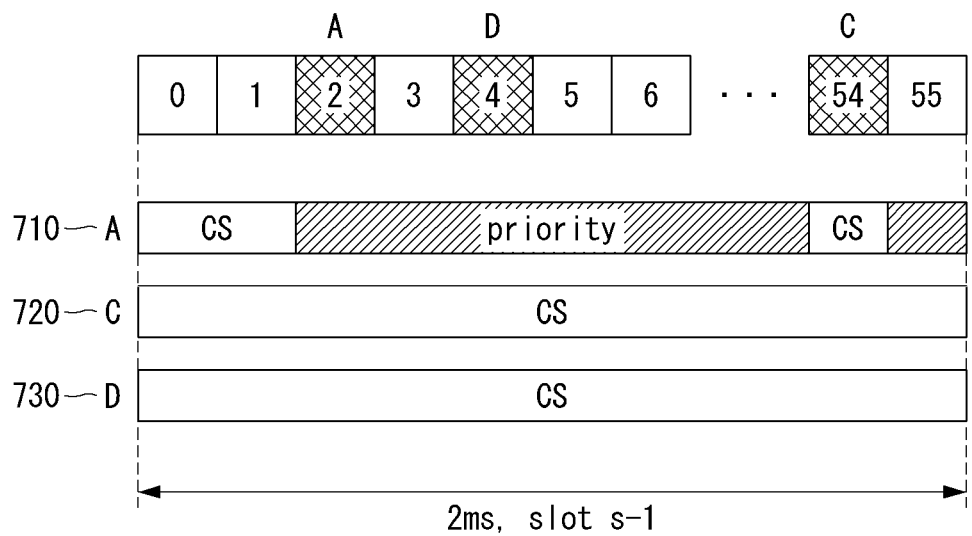
FIG. 7 is a conceptual diagram illustrating a second exemplary embodiment of a priority setting method of a synchronous wireless distributed communication system.

FIG. 7 is a conceptual diagram illustrating a second exemplary embodiment of a priority setting method of a synchronous wireless distributed communication system.

Referring to FIG. 7, the subslot 0 may be reserved as a clearing slot for stations with priority. In addition, only stations with priority may select subslots from the subslot 1 to a subslot N. The stations without priority may reserve a subslot N+1 as a clearing slot for stations without priority. In addition, a station without priority may perform contention to select one subslot from a subslot N+2 to the last subslot 55. In this case, a range of N may be from 2 to 53. Under the environment described above, if even one of the stations with priority attempts to occupy the slot, all the stations with priority may lose the contention.

For example, referring to FIG. 7, a station A 710 and a station D 730 may have priority, and a station C 720 may not have priority. In addition, when N is 6, the station A and the station D may select the subslot 2 and the subslot 4, respectively. Accordingly, the station A may win the contention. In this case, the station 720 without priority may unconditionally lose the contention. The station A that has won the first contention may perform the second contention.

Figure 8:
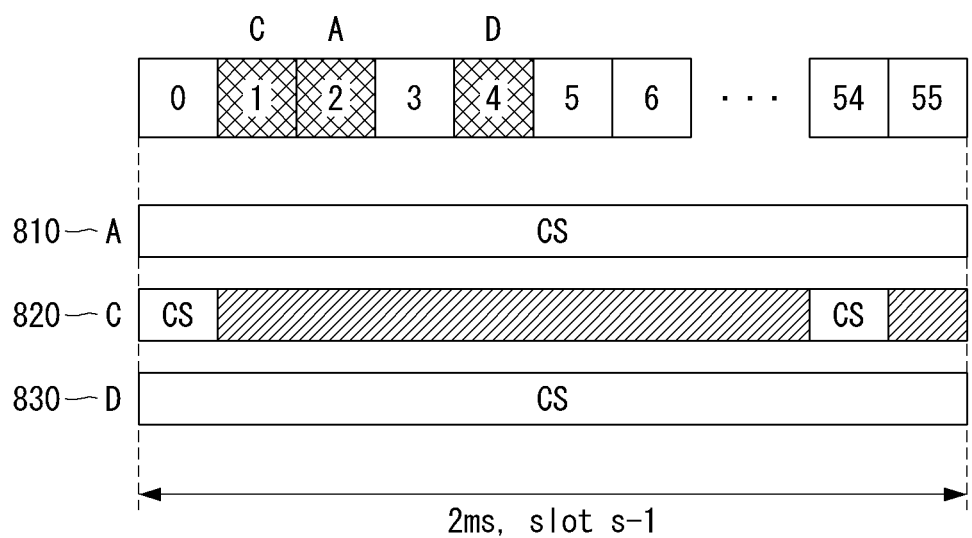
FIG. 8 is a conceptual diagram illustrating a third exemplary embodiment of a priority setting method of a synchronous wireless distributed communication system.

FIG. 8 is a conceptual diagram illustrating a third exemplary embodiment of a priority setting method of a synchronous wireless distributed communication system.

Referring to FIG. 8, the subslot 0 may be reserved as a clearing slot for stations with priority. In addition, the station with priority may select one subslot from the subslot 1 to the subslot N. The stations without priority may perform contention to select one subslot from the subslot 1 to the last subslot 55. In this case, for example, a range of N may be from 2 to 53. In the above-described environment, the station with priority may only have a higher contention winning probability than the station without priority. That is, the station with priority may not always win the contention against the station without priority.

More specifically, referring to FIG. 8, a station A 810 and a station D 830 may have priority, and a station C 820 may not have priority. In this case, N is 6, and the station A and the station D may select the subslot 2 and the subslot 4, respectively. However, as an example, if the station C without priority selects the subslot 1, the station C may win the contention even if it does not have priority. The station C, which has primarily won the contention, may perform contention again secondarily. For example, such the priority setting may be applied to all slots of the channel or only for some slots of the channel.

When priority is set in the CDAD scheme as described above, resource allocation contention may be performed from the subslot 3 or the subslot 4. That is, a predetermined number of subslots in the tone slot may be used for the resource allocation contention. In this case, front subslots may be used for the purposes of the slot clearing and priority setting. Therefore, the predetermined subslots may be subslots located at the rearmost of the tone slot. In general, it may be assumed that the contention is performed from a subslot a. Here, a may be defined as $0 \leq a \leq N_{subslot}-1$. Here, $N_{subslot}$ may be the number of tone subslots constituting one tone slot, and may be a positive integer. In the present disclosure, a may be set to 0, may be changeable, and may not be limited thereto.

When contention is performed in the tone slot consisting of $N_{subslot}$ subslots, stations may transmit tone signals in the respective subslots. The tone signal may have a length equal to or less than the length of the tone subslot. Referring again to FIG. 5, if the length of the tone subslot is 200 us, the length of the tone signal may be 180 us, and the remaining 20 us may be a guard time considering a propagation delay time and a synchronization error. In the SCMAC scheme, the black burst (BB) signal is used, and it may be almost the same as the tone signal without a margin. When transmitting the tone signal, if the tone signal is transmitted only during a part of the entire time of the subslot, effects of the propagation delay time and synchronization error may be eliminated. The BB signal of the SCMAC scheme may not consider such effects.

Figure 9:
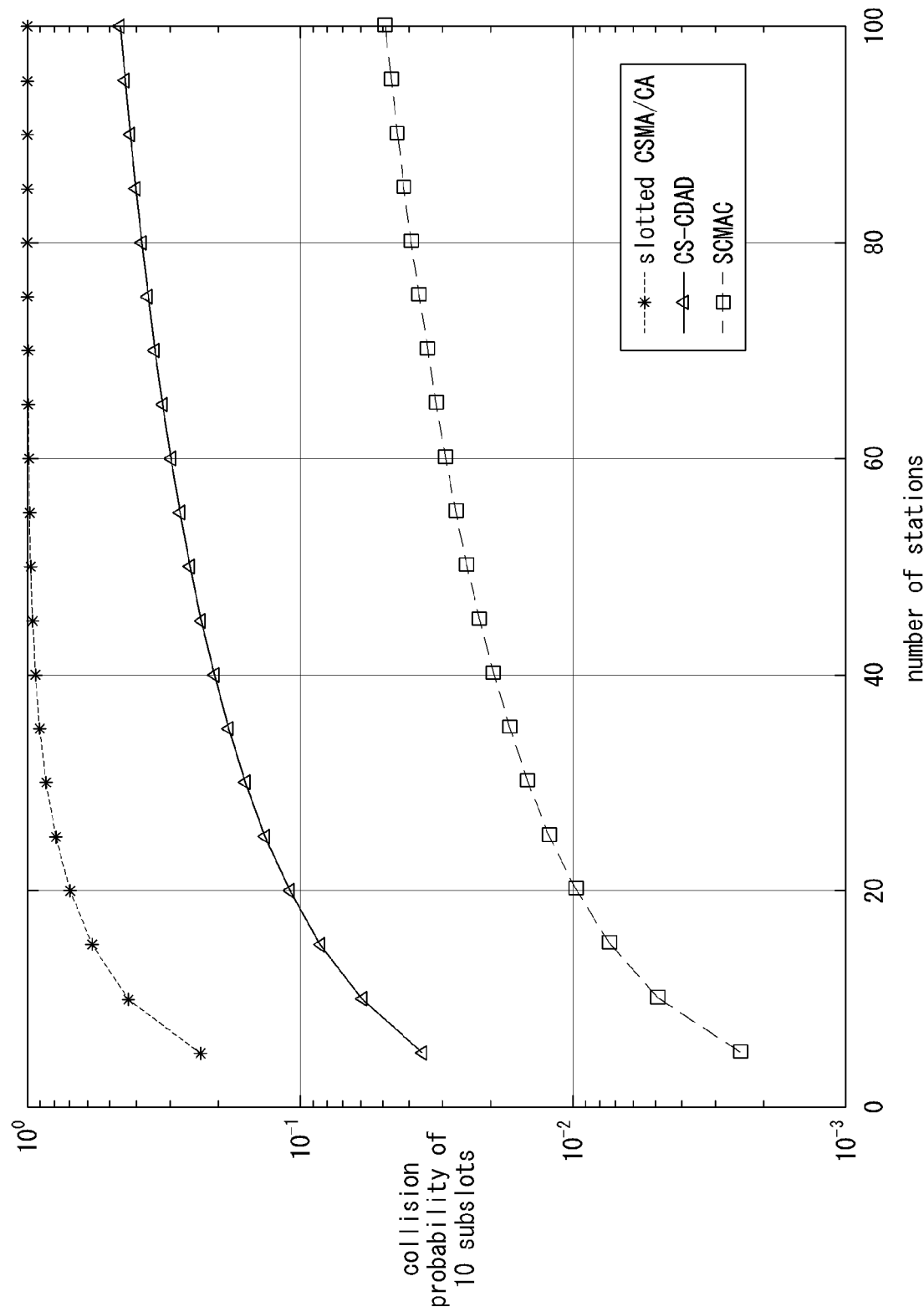
FIG. 9 is a graph illustrating a first example of comparing performances of the contention methods.

FIG. 9 is a graph illustrating a first example of comparing performances of the contention methods.

Referring to FIG. 9, it may be assumed that the slotted CSMA/CA scheme operates synchronously. That is, it may be assumed that stations are synchronized at a start time of the slotted CSMA/CA scheme. In the slotted CSMA/CA scheme, one contention may be performed in the tone slot consisting of $N_{subslot}$ subslots. That is, each of the stations may randomly select one number from subslot numbers from 0 to $N_{subslot}-1$ with equal probability, and a station that selects the earliest number may win the contention. Thereafter, the station that has won the contention may immediately start transmitting a packet.

On the other hand, in the CDAD scheme, contention may performed twice in one tone slot. That is, a station that selects the earliest number may win the first contention. In this respect, the CDAD scheme may be the same as the slotted CSMA/CA scheme. However, in the CDAD scheme, one more contention may be performed, and only stations that have won the first contention may perform the second contention. In the second contention, each of the stations may randomly select a subslot number again.

In the second contention, a station that selects the latest number may win the contention. In conclusion, the slotted CSMA/CA scheme may perform contention once, and the CDAD scheme may perform contention twice. Therefore, as shown in FIG. 9, a collision probability of the CDAD scheme may be lower than that of the slotted CSMA/CA scheme. That is, the performance of the CDAD scheme may be much better than that of the slotted CSMA/CA scheme.

Since the SCMAC scheme performs contention for every subslot, it may have the best performance. In the SCMAC scheme, a station may randomly select 1 or 0 with equal probability for every subslot. If the station selects 1, it may transmit a BB signal to win the contention unconditionally. If the station selects 0, it may perform carrier sensing. In this case, the station may lose the contention if it detects a BB signal of another station, and may win the contention if it does not detect a BB signal of another station. Such the contention may continue from the first subslot to the last subslot. That is, since the SCMAC scheme performs contention as many times as the number of subslots, it may have much better performance than the CDAD scheme.

However, from the perspective of the entire communication system, the SCMAC scheme may be inappropriate for use. In the SCMAC scheme, $N_{ue}$ stations may perform contention in a tone slot. Here, $N_{ue}$ may be a positive integer. In this case, on average, $N_{ue}/2$ stations may transmit BB signals by selecting 1 in the first subslot. In the wireless distributed communication system, this may cause an effect of amplifying a power of the BB signals transmitted in the first subslot by a factor of $N_{ue}/2$.

Figure 10:
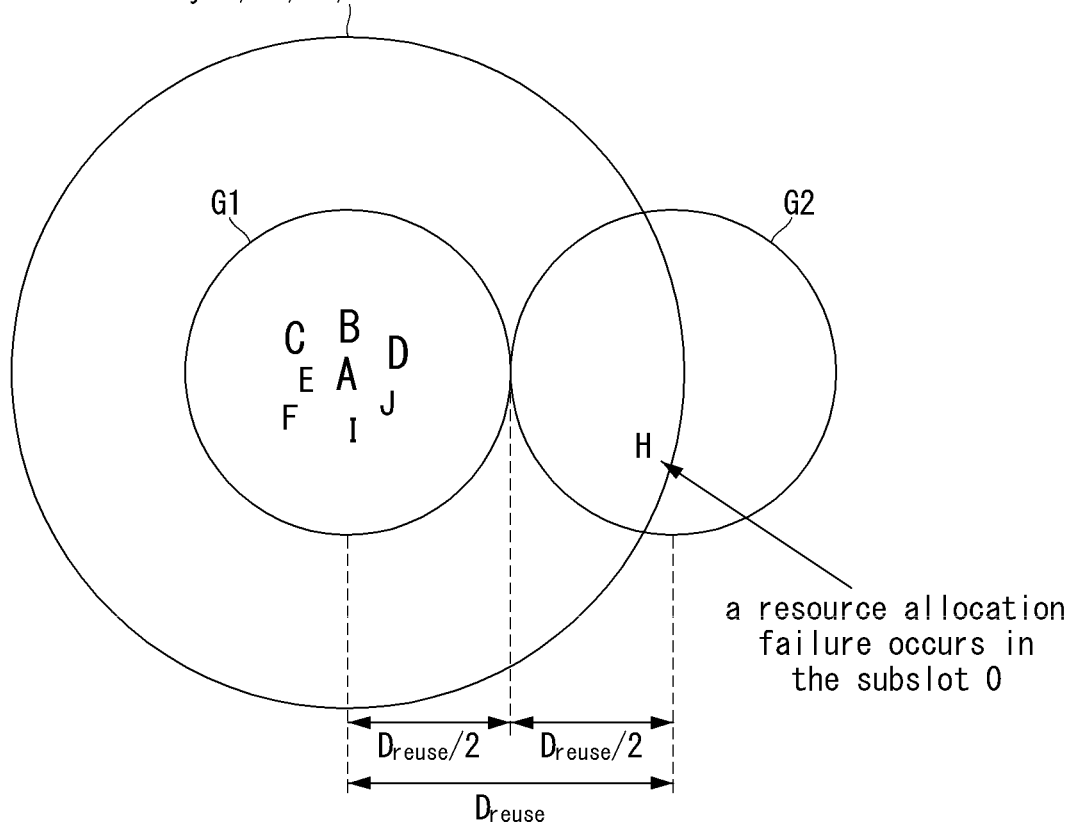
FIG. 10 is a conceptual diagram illustrating a first exemplary embodiment of a group-based contention method.

FIG. 10 is a conceptual diagram illustrating a first exemplary embodiment of a group-based contention method.

Referring to FIG. 10, a station A, station B, station C, station D, station E, station F, station J, and station I may be classified as a group 1 (G1). In addition, a station H may be classified as a group 2 (G2). As described above, eight stations belonging to the group 1 may perform contention in a slot s. In this case, four stations (i.e., station A, station B, station C, and station D) of the group 1 may select 1 in the subslot 0 (i.e., the first subslot), and may transmit BB signals in the subslot 0. Accordingly, a transmission power of the BB signals in the subslot 0 may be amplified by about four times. If the transmission power is amplified by about four times as described above, a communication distance may be increased by about two times.

Meanwhile, in the wireless distributed communication system, communication resources may be reused at intervals of a certain distance. For example, when a reuse distance is $D_{reuse}$, the maximum communication distance of each station may be $D_{reuse}/2$. Here, $D_{reuse}$ may be a positive real number. When the group 1 and the group 2 intend to use resources of the same slot s, the BB signals of the group 1 may reach up to the group 2 in the first subslot. In the group 2, only one station (i.e., station H) may perform contention. In this case, even when the station H is located more than $D_{reuse}/2$ away from the group 1, if the station H selects 0 in the first subslot, it may lose the contention because it detects the BB signal transmitted from the group 1 in the first subslot. That is, the BB signal of the group 1 may interfere with normal resource allocation contention of the group 2.

As a result, the station H in the group 2 may not be allocated the slot s. As described above, the SCMAC scheme may make the resource allocation process of the entire system unstable due to the effect of extending the transmission distance of the BB signal in the front subslots. The more stations there are in close proximity, the greater such the instability may be. Therefore, the present disclosure proposes a method capable of maintaining the stability of the entire wireless distributed communication system while utilizing the excellent resource allocation performance, which is the advantage of the SCMAC scheme.

Figure 11:
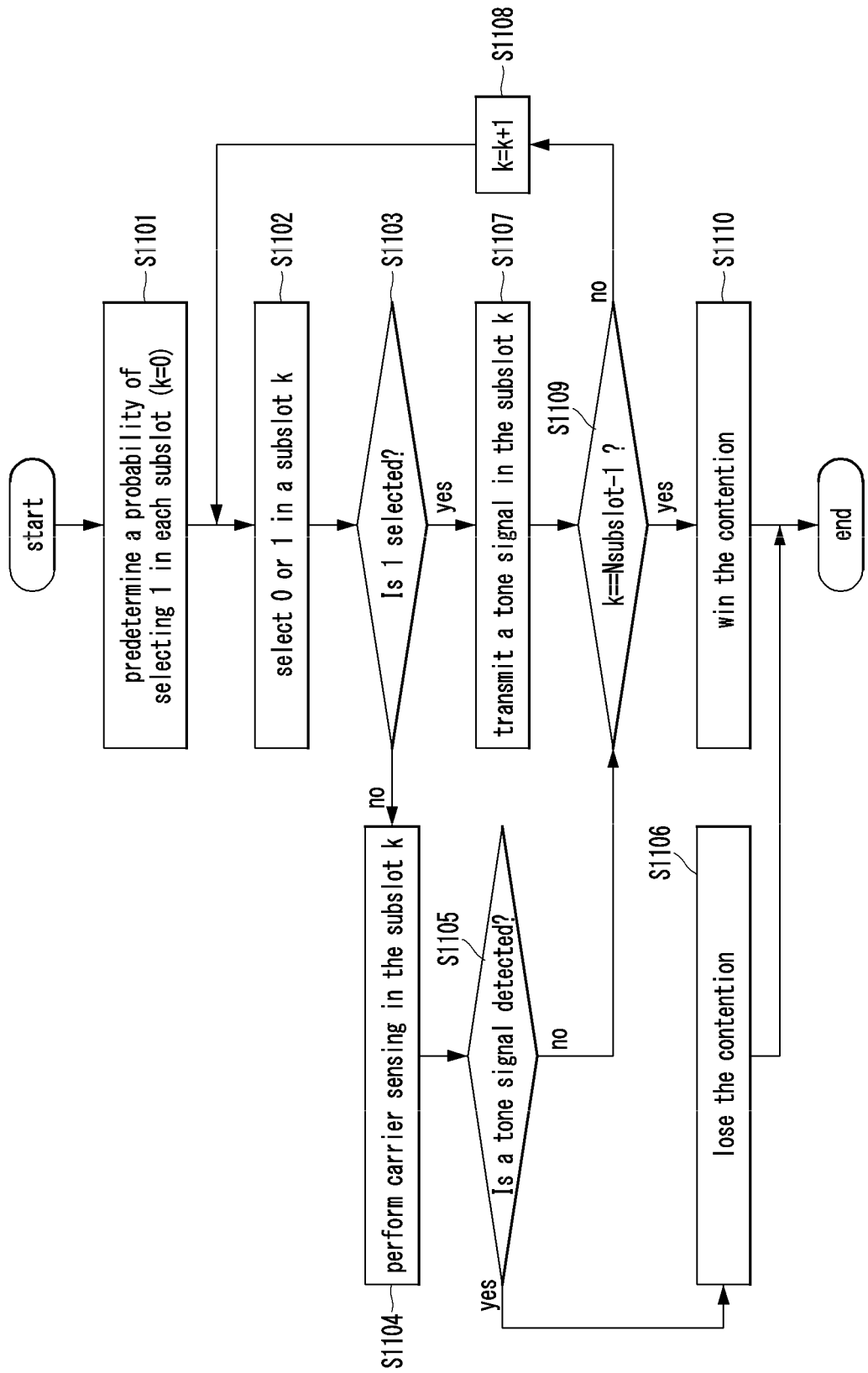
FIG. 11 is a flowchart illustrating a first exemplary embodiment of a method for performing resource allocation contention in a wireless distributed communication system.

FIG. 11 is a flowchart illustrating a first exemplary embodiment of a method for performing resource allocation contention in a wireless distributed communication system.

Referring to FIG. 11, when a station performs contention in a tone slot in the method for performing resource allocation contention, the station may perform contention in every subslot as in the SCMAC scheme. In this case, in order to prevent the extension of the communication distance of the tone signal in the front subslots, the station may predetermine a probability of selecting 1 in each subslot (S1101).

Table 1 shows a first example of a probability of selecting 1 in each subslot.

TABLE 1

| Subslot number | 0 | 1 | 2 | 3 | 4 | 5 | 6 | 7 | 8 | 9 |
|---|---|---|---|---|---|---|---|---|---|---|
| Probability of selecting 1 | 1/24 | 1/21 | 1/18 | 1/15 | 1/12 | 1/9 | 1/6 | 1/3 | 1/2 | 1/2 |

In Table 1, a probability that the station will select 1 in the subslot 0 is ¹⁄₂₄, a probability that the station will select 1 in the subslot 1 is ¹⁄₂₁, a probability that the station will select 1 in the subslot 2 is ¹⁄₁₈, a probability that the station will selects 1 in the subslot 7 is ⅓, and a probability that the station will selects 1 in the subslot 8 or 9 is ½. Here, the station may determine that the probability of selecting 1 in the front subslots are smaller than or equal to that in the rear subslots. Accordingly, the probability that the station selects 1 in the front subslots may be greatly reduced. The station may store an algorithm for selecting 1 or 0 therein. In this case, the station may configure the probability of selecting 1 according to the algorithm to follow the predetermined probability.

Meanwhile, Table 2 may indicate an average and a standard deviation of the number of stations that simultaneously win the contention in the same subslot when 10, 20, or 40 stations perform contention, respectively, based on the probability distribution according to Table 1.

TABLE 2

| Number of stations performing contention | Average of the number of stations winning for the first time in the same subslot | | Standard deviation of the number of stations winning for the first time in the same subslot | |
|---|---|---|---|---|
| | SCMAC scheme | Method of the first exemplary embodiment | SCMAC method | Method of the first exemplary embodiment |
| 10 | 5 | 1.284980 | 1.573350 | 0.563708 |
| 20 | 10 | 1.518920 | 2.233072 | 0.759580 |
| 40 | 20 | 2.084690 | 3.155799 | 1.123449 |

In Table 2, a probability of selecting 1 in all subslots may be ½ according to the conventional SCMAC scheme. For comparison, Table 2 shows an average and a standard deviation when using the SCMAC scheme together. Referring to Table 2, in the present disclosure to which the probability distribution of Table 1 is applied, it can be seen that the average and standard deviation of the resource allocation contention method according to the first exemplary embodiment are excellent. According to the first exemplary embodiment of the present disclosure, the average of the number of stations winning the contention in the first subslot may be approximately 1.3, 1.5, or 2.1. In addition, the standard deviation of the number of stations winning the contention in the first subslot may be approximately 0.56, 0.75, or 1.12. That is, the probability that two or more stations win at the same time and the transmission distance of the tone signal is extended may be very small. On the other hand, in the case of the SCMAC scheme, the average has a very large value such as 5, 10, and 20, which may make the entire system unstable.

As shown in Table 1, the wireless distributed communication system makes the probability of selecting 1 smaller as the subslot has a higher number, thereby significantly improving the stability of the wireless distributed communication system as shown in Table 2.

Meanwhile, the probability distribution shown in Table 1 may be a distribution having a probability in which the probability of selecting 1 increases linearly as the index of the subslot increases. In addition to such the linearly increasing probability distribution, the station may select an exponentially increasing probability distribution or a probability distribution designed for a specific purpose. Depending on which probability distribution is selected, the average and standard deviation of the number of stations winning simultaneously in the same subslot may vary. As a result, the selected probability distribution may have a large impact on stability of the system.

Meanwhile, the station may randomly select one subslot among $N_{subslot}$ subslots with equal probability. Here, $N_{subslot}$ may be a positive integer. In this case, the number indicating the subslot selected by the station may be k ($0 \leq k \leq N_{subslot}-1$). Here, k may be a positive integer. The station may designate k as 0 in the first exemplary embodiment. Accordingly, the station may select 0 or 1 in the subslot k based on the predetermined probability distribution (S1102). Thereafter, the station may determine whether 1 is selected in the subslot k (S1103). As a result of the determination, the station may perform carrier sensing in the subslot k if 1 is not selected in the subslot k (S1104). In addition, the station may regard that it has lost the contention when a tone signal of another station (i.e., a signal transmitted from another signal when the another station performs the contention in the subslot k) is detected in the carrier sensing (S1106). On the other hand, the station may determine whether k is equal to $N_{subslot}-1$ when a tone signal of another station (i.e., a signal transmitted from another signal when the another station performs the contention in the subslot k) is not detected in the carrier sensing (S1109). As a result of the determination, the station may regard that it has won the contention if k is equal to $N_{subslot}-1$ (S1110). Alternatively, as a result of the determination, the station may repeat the contention from the step S1102 after adding 1 to k if k is not equal to $N_{subslot}-1$ (S1108).

On the other hand, as a result of the determination in step S1103, if the station selects 1 in the subslot k, the station may transmit a tone signal in the subslot k (S1107). In addition, the station may determine whether k is equal to $N_{subslot}-1$ (S1109). As a result of the determination, the station may regard that the station has won the contention if k is equal to $N_{subslot}-1$ (S1110). Alternatively, as a result of the determination, the station may repeat the contention from the step S1102 after adding 1 to k if k is not equal to $N_{subslot}-1$ (S1108). Through the above-described process, if the station wins the contention as many times as the total number of subslots, $N_{subslot}$, the station may finally win the contention.

In the above-described first exemplary embodiment, the number of subslots and the number of stations performing contention may be parameters required to determine an optimal probability distribution. However, the number of stations performing contention may be variable. Accordingly, it may be difficult for the station to determine an optimal probability distribution in advance in the wireless distributed communication system. Therefore, securing constant performance regardless of the number of sub slots and the number of stations performing contention may be very necessary for the system stability.

Accordingly, in the method for performing resource allocation contention according to the second exemplary embodiment of the present disclosure, the wireless distributed communication system may evenly distribute stations to all subslots. In the method for performing resource allocation contention according to the second exemplary embodiment, the stations may first perform contention such as the slotted CSMA/CA scheme. That is, each station may perform the first contention of the CDAD scheme. That is, each station may randomly select one subslot with equal probability among $N_{subslot}$ subslots. Accordingly, the wireless distributed communication system can secure the system stability to some extent.

Table 3 shows an average and a standard deviation of the number of stations that simultaneously win the contention for the first time in the same subslot when the stations perform contention in the slotted CSMA/CA scheme.

TABLE 3

| Number of stations performing contention | Average of the number of stations winning for the first time in the same subslot | Standard deviation of the number of stations winning for the first time in the same subslot |
| --- | --- | --- |
| 10 | 1.577220 | 0.779382 |
| 20 | 2.301600 | 1.205536 |
| 40 | 4.073800 | 1.849825 |

Since all stations ate distributed evenly, the averages and standard deviations shown in Table 3 may mean slightly worse performance than that of the averages and standard deviations shown in Table 2 according to the first exemplary embodiment of the present disclosure.

However, the performance shown in Table 3 may be much better than that of the SCMAC scheme. In addition, the wireless distributed communication system can secure stable performance regardless of the number of slots and the number of stations performing contention.

As described above, the stations may select one subslot among $N_{subslot}$ subslots in the first contention, thereby securing the average stability of the system, and then contention may be performed for every subslot after the first contention.

Figure 12:
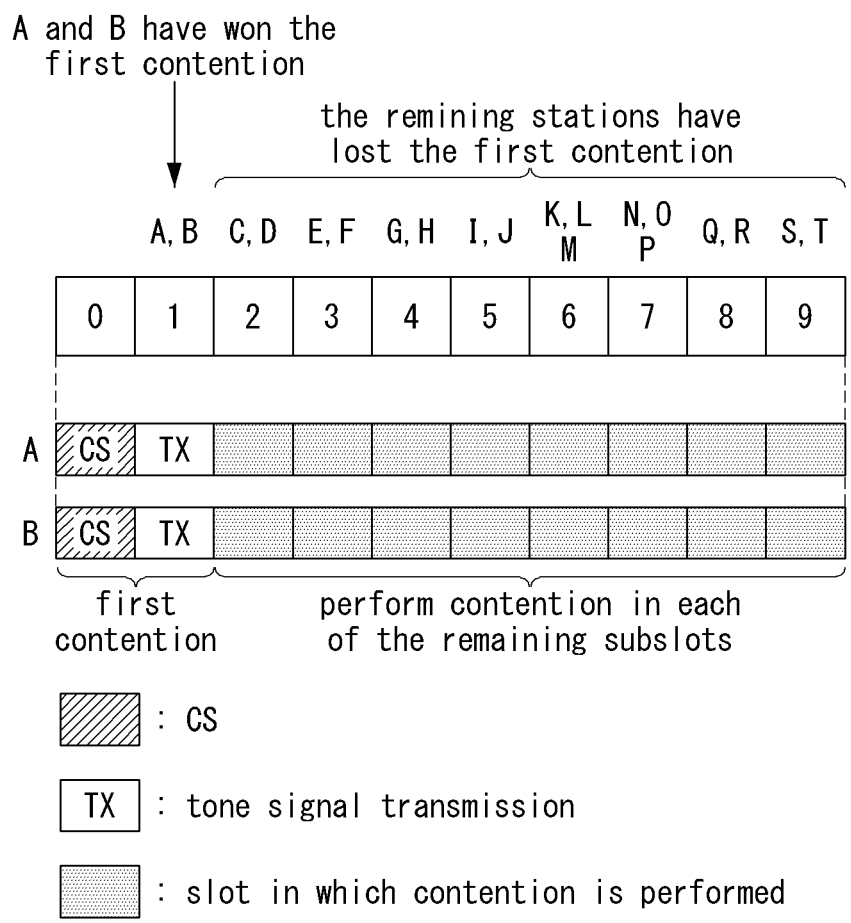
FIG. 12 is a flowchart illustrating a second exemplary embodiment of a method for performing resource allocation contention in a wireless distributed communication system.

FIG. 12 is a flowchart illustrating a second exemplary embodiment of a method for performing resource allocation contention in a wireless distributed communication system.

Referring to FIG. 12, 20 stations may perform the first contention in the tone slot s. In this case, it may be assumed that a station A and a station B win the contention in the subslot 1. Then, the station A and the station B may perform contention in every subslot from the subslot 2 to the subslot 9. In this case, the station A and the station B may adjust a probability of selecting 1 in each subslot from the subslot 2 to the subslot 9.

Here, since the station A and station B selected the subslot 1 in the first contention, they may perform a total of 9 contentions. That is, when winning by selecting the subslot k in the first contention, the station may perform a total of $N_{subslot}-k$ contentions. In this case, the station A and the station B may adjust a probability of selecting 1 for the contentions from the second contention to $(N_{subslot}-k)$-th contention. Table 4 shows a probability distribution according thereto.

TABLE 4

| Subslot number | 1 | 2 | 3 | 4 | 5 | 6 | 7 | 8 | 9 |
| --- | --- | --- | --- | --- | --- | --- | --- | --- | --- |
| Probability of selecting 1 | 1/24 | 1/12 | 1/6 | 1/3 | 1/3 | 1/2 | 1/2 | 1/2 | 1/2 |

The probability distribution in Table 1 may be designed very elaborately, whereas the probability distribution in Table 4 may be designed relatively simply. This may be because most of the stations have already lost the first contention and very few stations are expected to perform the second contention. According to the probability distribution of Table 4, the station A and the station B of FIG. 11 may select 1/12 as a probability of selecting 1 when performing the second contention in the subslot 2. If the station wins the second contention in the subslot 2, it may select 1 in the subslot 3 with a probability of 1/6. In the above-described manner, the station may select 1 in the subslot 9 with a probability of 1/2.

Figure 13A:
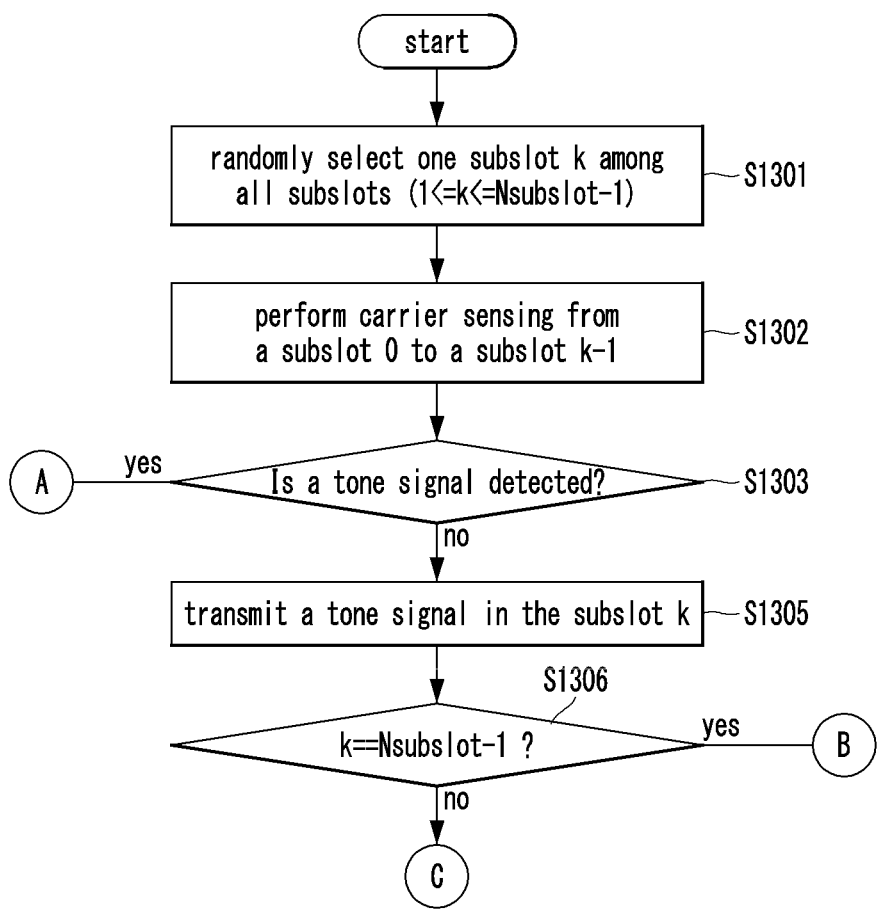
FIGS. 13A and 13B are flowcharts illustrating a first exemplary embodiment of a method for performing resource allocation contention in a wireless distributed communication system.
Figure 13B:
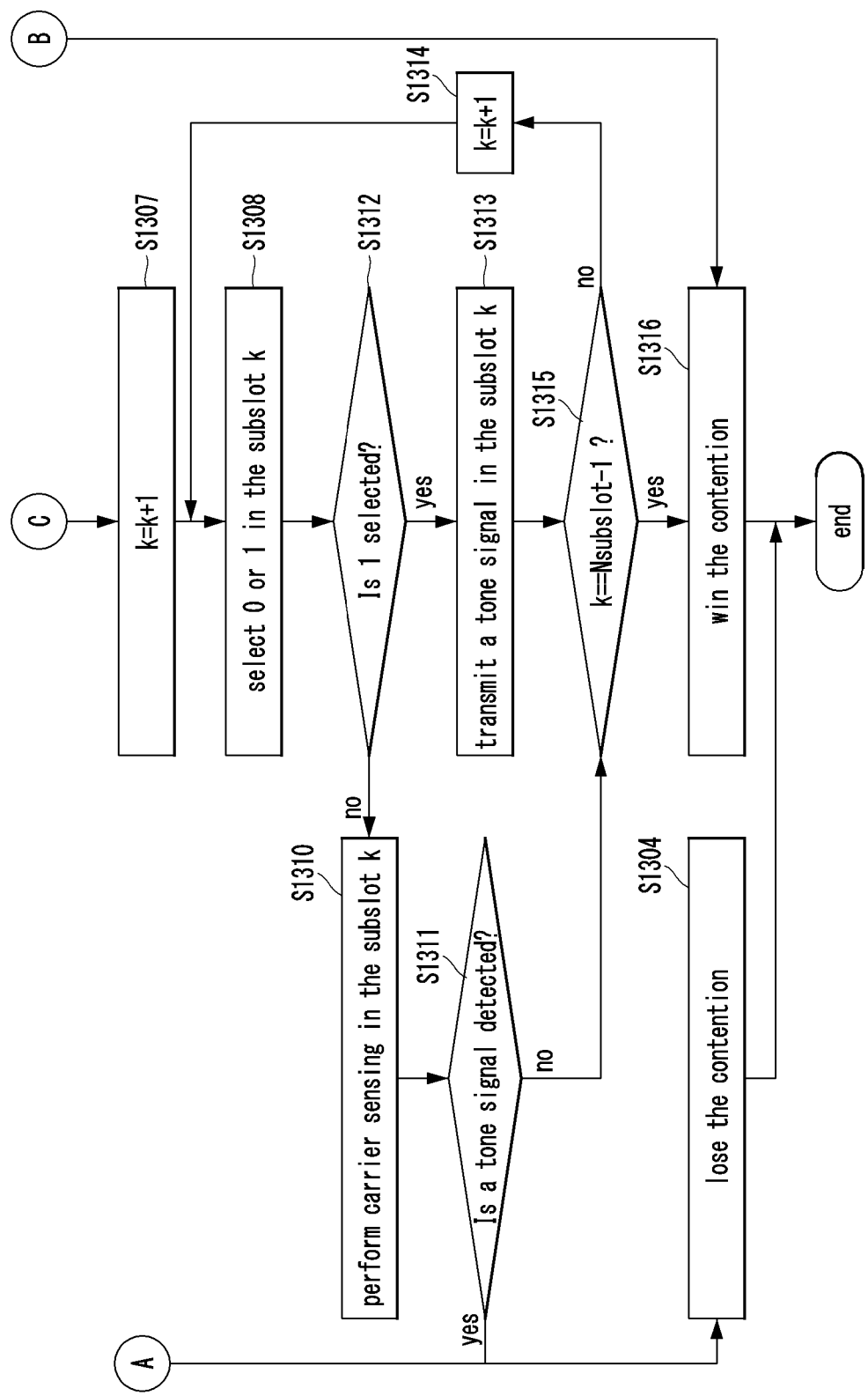

FIGS. 13A and 13B are flowcharts illustrating a first exemplary embodiment of a method for performing resource allocation contention in a wireless distributed communication system.

Referring to FIGS. 13A and 13B, a station may predetermine a probability of selecting 1 in each subslot. For example, as shown in Table 1, the station may predetermine the probability of selecting 1 in each subslot. In this case, the station may store an algorithm for selecting 1 or 0 therein, and the station may configure the probability of selecting 1 according to algorithm to follow the predetermined probability. Meanwhile, in order to perform the first contention, the station may first randomly select one subslot k with equal probability among subslots from the i-th subslot to the last subslot (S1301). In general, i may be 0, but i may have a value other than 0 when the slot clearing scheme or priority setting is applied.

Meanwhile, the station may perform carrier sensing from the subslot 0 to the subslot k-1 (S1302) to determine whether a tone signal of another station is detected (S1303). As a result of the determination, the station may regard that it has lost the first contention if a tone signal of another station is detected (S1304). Alternatively, if a tone signal of another station is not detected, the station may regard that it has won the first contention and may transmit a tone signal from the subslot k (S1305). In this case, if k is i, the station may unconditionally win the first contention.

Then, the station may determine whether k is equal to $N_{subslot}-1$ (S1306). As a result of the determination, if k is equal to $N_{subslot}-1$, the station may regard that it has won the contention (S1316). On the other hand, if k is not equal to $N_{subslot}-1$, the station may add 1 to k (S1307), and then select 0 or 1 in the subslot k based on the predetermined probability distribution as shown in Table 1 (S1308). In this case, the station may select 1 using an adjusted probability distribution after adjusting the predetermined probability distribution as shown in Table 1 to the probability distribution as shown in Table 4. In this case, the station may configure the internally stored algorithm to follow the adjusted probability.

Thereafter, the station may determine whether 1 is selected in the subslot k (S1312). As a result of the determination, if 1 is not selected in the subslot k, the station may perform carrier sensing in the subslot k (S1310). In addition, the station may regard that it has lost the contention when a tone signal of another station (i.e., a signal transmitted from another station when the another station performs the contention in the same subslot) is detected in the carrier sensing (S1311 and S1304).

On the other hand, the station may determine whether k is equal to $N_{subslot}-1$ when a tone signal of another station (i.e., a signal transmitted from another station when the another station performs the contention in the same subslot) is not detected in the carrier sensing (S1315). As a result of the determination, if k is equal to $N_{subslot}-1$, the station may regard that it has won the contention (S1316). Alternatively, as a result of the determination, if k is not equal to $N_{subslot}-1$, the station may repeat the contention from step S1308 after adding 1 to k (S1314).

Meanwhile, as a result of the determination in step S1312, the station may transmit a tone signal in the subslot k (S1313), and determine whether k is equal to $N_{subslot}-1$ (S1315). As a result of the determination, if k is equal to $N_{subslot}-1$, the station may regard that it has won the contention (S1316). Alternatively, as a result of the determination, if k is not equal to $N_{subslot}-1$, the station may repeat the contention from the step S1308 after adding 1 to k (S1314).

As described above, the station that has won the first contention may perform contention of selecting 1 or 0 for every subslot from the subslot k+1 to the last subslot. In this case, the station may select 1 using a predetermined probability distribution (Table 1 or Table 4). Alternatively, the station may select 1 using a probability distribution (e.g., Table 4) obtained by adjusting the predetermined probability distribution (e.g., Table 1). Here, if k is the number indicating the last subslot, the station may regard the winning of the first contention as final winning.

Figure 14:
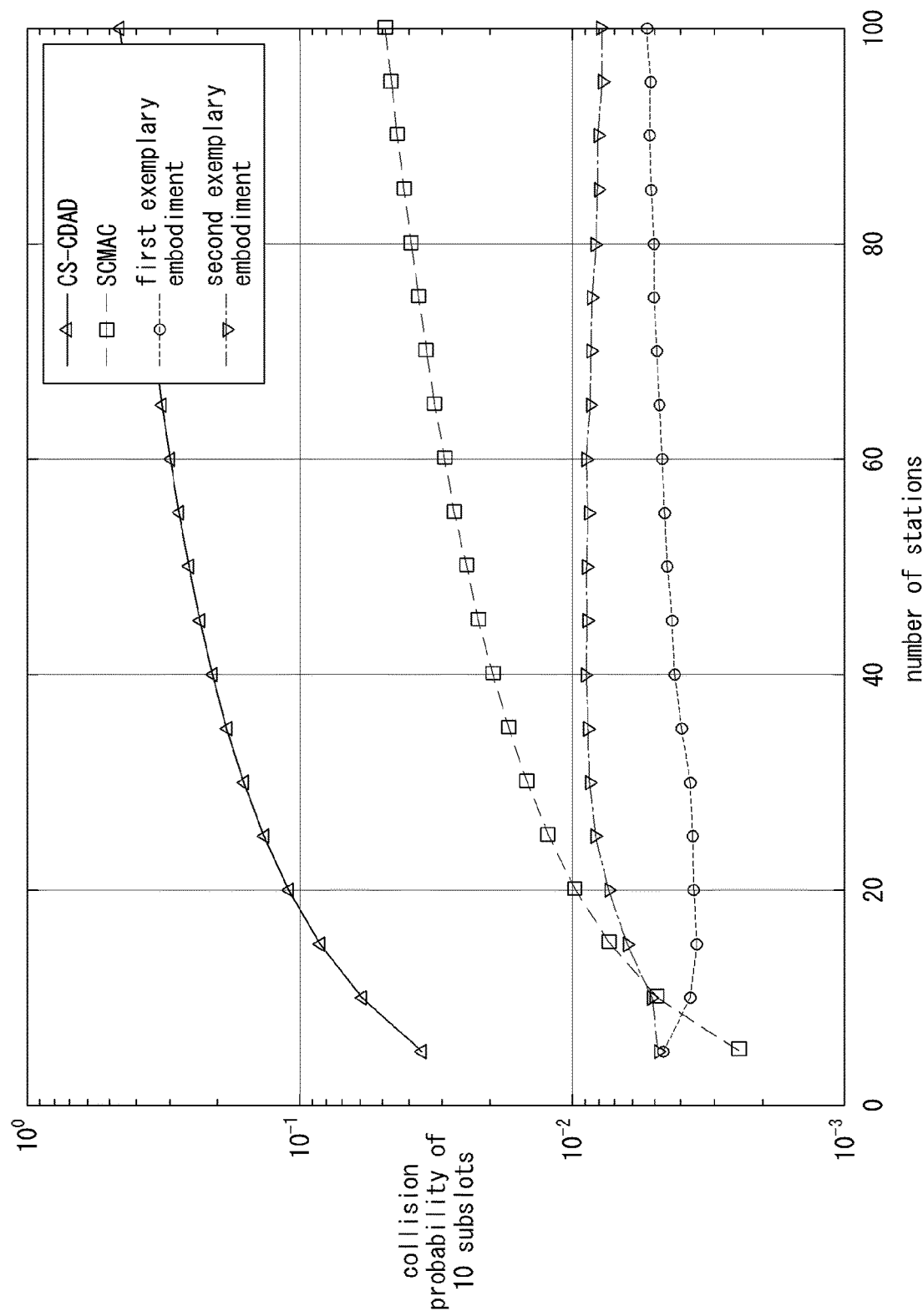
FIG. 14 is a graph illustrating a second example of comparing performances of the contention methods.

FIG. 14 is a graph illustrating a second example of comparing performances of the contention methods.

FIG. 14 shows the performance (i.e., collision probability according to the number of stations performing contention) of the first exemplary embodiment of the present disclosure using the probability distribution of Table 1 and the performance of the second exemplary of the present disclosure using the probability distribution of Table 4. As can be seen in FIG. 12, the performance of the exemplary embodiments of the present disclosure may be best when the number of stations is approximately 10 or more. In particular, performance degradation due to an increase in the number of stations may not occur. The exemplary embodiments of the present disclosure may not perform well with a small number of stations due to a probability that all stations may not select 1 until the last subslot. This problem may be solved by setting the probability of the subslot 10 to 1. In conclusion, the resource allocation contention methods proposed as the first and second exemplary embodiments in the present disclosure can improve the resource allocation contention performance while dramatically reducing the probability of simultaneously transmitting tone signals from multiple stations.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter. Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus. In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. An operation method of a station in a wireless distributed communication system, the operation method comprising:
   determining a probability distribution for selecting a first value in each subslot of a slot of a channel used for performing contention;
   selecting the first value based on the probability distribution in a subslot k among predetermined subslots, wherein k is 0 or a positive integer;
   transmitting a tone signal in the subslot k when the first value is selected in the subslot k; and
   winning the contention by selecting the first value in remaining subslots after the subslot k.

2. The operation method according to claim 1, wherein the probability distribution has a distribution in which a probability of selecting the first value increases linearly or exponentially as an index of the each subslot increases.

3. The operation method according to claim 1, wherein the probability distribution has a distribution in which a probability of selecting the first value in a subslot having a first index is equal to or less than a probability of selecting the first value in a subslot having a second index, and the first index is smaller than the second index.

4. The operation method according to claim 1, wherein the winning of the contention by selecting the first value in the remaining subslots after the subslot k comprises:
   determining whether k is equal to a value obtained by subtracting 1 from a total number of subslots of the slot;
   regarding the station as having won the contention, when k is equal to the value obtained by subtracting 1 from the total number of subslots;
   adding 1 to k, when k is not equal to the value obtained by subtracting 1 from the total number of sub slots;
   selecting the first value again in the subslot k;
   transmitting the tone signal again in the subslot k when the first value is selected again in the subslot k; and
   repeating the contention from the determining of whether k is equal to the value obtained by subtracting 1 from the total number of subslots.

5. The operation method according to claim 1, wherein in the transmitting of the tone signal in the subslot k, the tone signal is transmitted during a part of a total time of the subslot.

6. The operation method according to claim 1, wherein the predetermined subslots correspond to subslots having indexes after a middle index of total subslots of the slot.

7. An operation method of a station in a wireless distributed communication system, the operation method comprising:
   selecting a subslot k from among predetermined subslots;
   performing carrier sensing up to a subslot k−1;
   transmitting a tone signal in the subslot k when a tone signal of another station is not detected as a result of performing the carrier sensing; and
   winning contention by selecting a first value in remaining subslots after the subslot k, wherein a range of k is positive integers from 1 to N, and N is a number of the predetermined subslots and is a positive integer.

8. The operation method according to claim 7, further comprising: determining a probability distribution for selecting the first value in each subslot among the predetermined subslots, wherein in the winning of the contention by selecting the first value in the remaining subslots after the subslot k, the station selects the first value based on the probability distribution.

9. The operation method according to claim 8, wherein the probability distribution has a distribution in which a probability of selecting the first value increases linearly or exponentially as an index of the each subslot increases.

10. The operation method according to claim 8, wherein the probability distribution has a distribution in which a probability of selecting the first value in a subslot having a first index is equal to or less than a probability of selecting the first value in a subslot having a second index, and the first index is smaller than the second index.

11. The operation method according to claim 7, wherein the winning of the contention by selecting the first value in the remaining subslots after the subslot k comprises:
determining whether k is equal to a value obtained by subtracting 1 from a total number of subslots of the slot;
regarding the station as having won the contention, when k is equal to the value obtained by subtracting 1 from the total number of subslots;
adding 1 to k, when k is not equal to the value obtained by subtracting 1 from the total number of sub slots;
selecting the first value again in the subslot k;
transmitting the tone signal again in the subslot k when the first value is selected again in the subslot k; and
repeating the contention from the determining of whether k is equal to the value obtained by subtracting 1 from the total number of subslots.

12. The operation method according to claim 11, further comprising:
performing carrier sensing in the subslot k when the first value is not selected in the subslot k; and
regarding the station as having lost the contention, when a tone signal of another station is detected in the carrier sensing.

13. The operation method according to claim 7, wherein the predetermined subslots correspond to subslots having indexes after a middle index of total subslots of the slot.

14. A station comprising a processor, wherein the processor causes the station to perform:
determining a probability distribution for selecting a first value in each subslot of a slot of a channel used for performing contention;
selecting the first value based on the probability distribution in a subslot k from among predetermined subslots, wherein k is 0 or a positive integer;
transmitting a tone signal in the subslot k when the first value is selected in the subslot k; and
winning the contention by selecting the first value in remaining subslots after the subslot k.

15. The station according to claim 14, wherein the probability distribution has a distribution in which a probability of selecting the first value in a subslot having a first index is equal to or less than a probability of selecting the first value in a subslot having a second index, and the first index is smaller than the second index.

16. The station according to claim 14, wherein in the winning of the contention by selecting the first value in the remaining subslots after the subslot k, the processor further causes the station to perform:
determining whether k is equal to a value obtained by subtracting 1 from a total number of subslots of the slot;
regarding the station as having won the contention, when k is equal to the value obtained by subtracting 1 from the total number of subslots;
adding 1 to k, when k is not equal to the value obtained by subtracting 1 from the total number of sub slots;
selecting the first value again in the subslot k;
transmitting the tone signal again in the subslot k when the first value is selected again in the subslot k; and
repeating the contention from the determining of whether k is equal to the value obtained by subtracting 1 from the total number of subslots.

* * * * *